(12) United States Patent
Persaud

(10) Patent No.: US 11,213,015 B2
(45) Date of Patent: Jan. 4, 2022

(54) SYSTEM AND A METHOD OF LAB ANIMAL OBSERVATION

(71) Applicant: Eknauth Persaud, Arlington, TX (US)

(72) Inventor: Eknauth Persaud, Arlington, TX (US)

( * ) Notice: Subject to any disclaimer, the term of this patent is extended or adjusted under 35 U.S.C. 154(b) by 0 days.

(21) Appl. No.: 16/700,293

(22) Filed: Dec. 2, 2019

(65) Prior Publication Data

US 2021/0076643 A1 Mar. 18, 2021

Related U.S. Application Data

(60) Provisional application No. 62/901,263, filed on Sep. 17, 2019.

(51) Int. Cl.
| | |
|---|---|
| *G06K 9/00* | (2006.01) |
| *A01K 29/00* | (2006.01) |
| *G06T 7/246* | (2017.01) |
| *G06T 7/73* | (2017.01) |
| *G08B 5/22* | (2006.01) |
| *A01K 1/03* | (2006.01) |

(52) U.S. Cl.
CPC ............ *A01K 29/005* (2013.01); *A01K 1/031* (2013.01); *G06K 9/00335* (2013.01); *G06K 9/00718* (2013.01); *G06K 9/00744* (2013.01); *G06T 7/246* (2017.01); *G06T 7/73* (2017.01); *G08B 5/22* (2013.01); *G06K 2009/00738* (2013.01); *G06T 2200/24* (2013.01); *G06T 2207/10016* (2013.01)

(58) Field of Classification Search
CPC ........ A01K 29/005; A01K 1/031; G06T 7/73; G06T 7/246; G06T 2207/10016; G06T 2200/24; G06K 9/00335; G06K 9/00718; G06K 9/00744; G06K 2009/00738; G08B 5/22

See application file for complete search history.

(56) References Cited

U.S. PATENT DOCUMENTS

| | | | | |
|---|---|---|---|---|
| 2004/0141635 | A1* | 7/2004 | Liang | A61B 5/4094 382/110 |
| 2017/0046567 | A1* | 2/2017 | Hong | G06K 9/46 |
| 2020/0060225 | A1* | 2/2020 | Roberson | G03B 15/02 |
| 2020/0383299 | A1* | 12/2020 | Bermudez Contreras | G08B 6/00 |

* cited by examiner

*Primary Examiner* — Tom Y Lu
(74) *Attorney, Agent, or Firm* — Thrasher IP Law

(57) ABSTRACT

A system and method for automating a recorded observed behavior of a laboratory animal in a clinical trial is disclosed. The present invention records a video of the laboratory animal with respect to one or more objects. The recorded data is utilized to detect at least one feature points such as head, whiskers, tail, waist etc. of the animal and a one or more objects in video, wherein the one or more objects are a known object and an unknown object. The present invention thus automatically determines the behavior characteristics of the animal by measuring a proximity and comparing the proximity with a predefined threshold criterion with respect to the one or more objects without human intervention. The behavior characteristics are determined in the form of a type of behavioral events, a time interval, number of occurrences of each type of behavioral events, latency, and distance travelled by the animal.

6 Claims, 4 Drawing Sheets

SYSTEM AND A METHOD OF LAB ANIMAL OBSERVATION

CROSS REFERENCE TO RELATED APPLICATION

This application claims the benefit of priority of U.S. provisional application No. 62/901,263, filed Sep. 17, 2019 to common inventor Eknauth Persaud, the contents of which are herein incorporated by reference.

FIELD OF THE INVENTION

The present invention relates to automation of laboratory measurements and more particularly, to a system and a method for lab animal observation during clinical trials.

BACKGROUND

The pharmaceutical industry is a massive and research-oriented field that discovers, develops, produces and markets drugs for use as medications. To bring a drug into the market, the drug needs to pass a tremendous amount of laboratory testing in order to comply to the standards of food and drug administration (FDA). Frequently, the development of the new drugs and the medications requires numerous tests to study their effects on various laboratory animals before the medications are made available to the general public for consumption.

Many techniques have been used to monitor and observe the effects of the drugs on lab animals. One technique involves observing animals in a lab to record/detect difference(s) between a group of control animals and a second group of test animals. However, this process is accomplished under substantial human observations, which are very expensive and subject to misinterpretation, confusion, and other errors.

To make the aforementioned process efficient, various methods have been introduced in the prior art. U.S. Pat. No. 7,269,516 (Brunner, et. al.) describes a system and a method for monitoring behavior informatics by mining experimental information to identify pattern(s) from data measurement databases collected from observation.

In another publication, U.S. Pat. No. 7,882,135 (Brunner, et. al.), a method for predicting treatment classes using behavior informatics is described. The patent discloses a method of obtaining behavioral, physiological, neurological and biochemical measurements of animals treated with test compound and employing machine learning engine to incrementally analyze observed reaction, response, and behavior over time.

U.S. Pat. No. 9,767,230 (Kimchi, et al.) discloses identifying and classifying social complex behaviors within/between group(s) of model organisms by automatically tracking momentary position of models in group over time and analyzing data collected.

Similarly, U.S. Pat. No. 9,317,743 (Datta, et. al.) discloses studying behavior of animal in experimental area by stimulating, collecting data, analyzing and developing quantitative behavioral primitive.

Further, U.S. Pat. No. 10,292,369 (Heath, et. Al.) discloses analyzing optical-flow signal in spatial region-of-interest to detect biological features/characteristics/changes without physically contacting experimental animal.

However, in the prior art, there is no system and method for automating a recorded observed behavior of laboratory animal that is fast and reliable. Therefore, there is an urgent need for an inventive approach that can overcome the limitations associated with conventional laboratory measurement techniques.

In order to solve the aforementioned problems, the present invention provides a system and a method to observe activities and behavior of the laboratory animals to provide accurate and automatic measurements of medical/clinical trials.

SUMMARY

The present invention discloses an artificial intelligence based platform to enable automation of laboratory measurements. In a first aspect of the invention, a method for automatically determining a behavior characteristic of an animal during clinical trials is provided. The method includes detecting, by a detection module, at least one feature point of an animal and one object in a video image, where the object(s) include at least one known object and at least one unknown object. The method also includes measuring, by a measurement module, a proximity between a feature points of the animal and the object(s), and then automatically determining behavior characteristics, by a behavior determination module, of the animal. This is accomplished by detecting that the proximity meets a predefined threshold criteria, wherein the behavior characteristics comprise a type of behavioral events of the animal, a time interval corresponding to each type of behavioral events, a number of occurrences of each type of behavioral events, a latency associated with each type of behavioral events, and a distance travelled by the animal. Next, the method includes providing a notification message, by a notification module, indicating the behavior characteristics of said animal.

BRIEF DESCRIPTION OF DRAWINGS

The preferred embodiment of the invention will be described in conjunction with the appended drawings provided to illustrate and not to limit the scope of the invention, where like designations denote like elements, and in which.

DETAILED DESCRIPTION

Figure 1A:
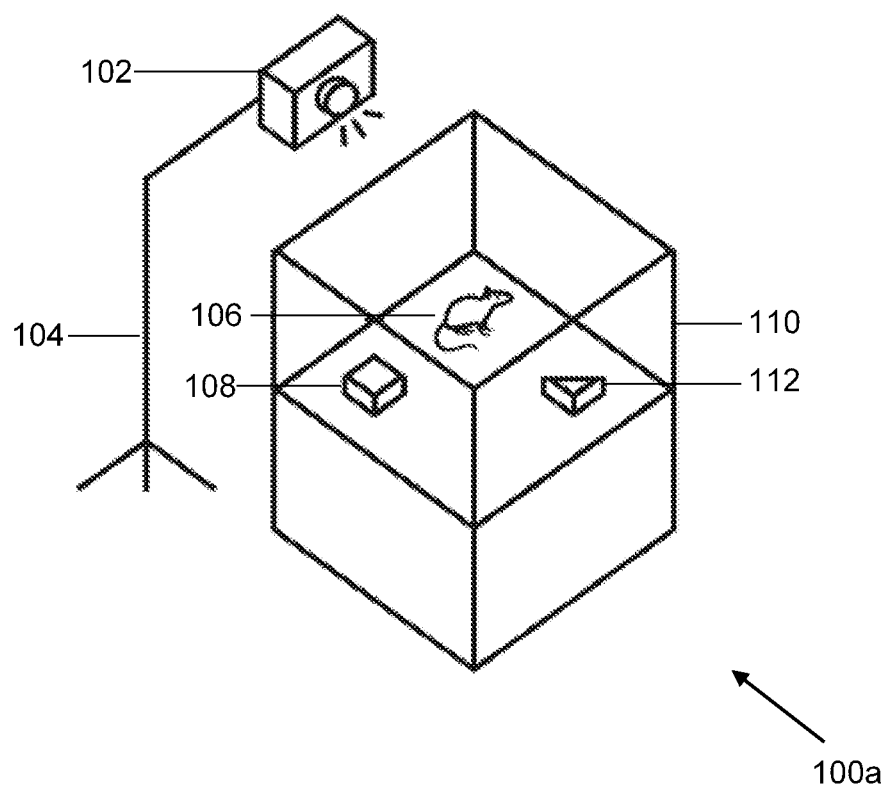
FIG. 1A illustrates a schematic representation of a laboratory system.

In the following detailed description of embodiments of the invention, numerous specific details are set forth in order to provide a thorough understanding of the embodiment of invention. However, it will be obvious to a person skilled in the art that the embodiments of invention may be practiced with or without these specific details. In other instances, well known methods, procedures and components have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The expression 'artificial intelligence platform' or 'platform' or "software" may be interchangeably used without departing from the meaning and scope of the present invention.

The present invention provides an artificial intelligence platform which is created from a machine learning method called deep learning. The machine learning enables the platform to automatically learn and improve from experience without being explicitly programmed.

One deep learning method uses a neural network capable of learning in an unsupervised manner from data that is unstructured or unlabeled. Deep learning is a method of machine learning that employs multiple layers of neural networks that enable the platform of the present invention to teach itself through inference and pattern recognition, rather than development of procedural code or explicitly coded software algorithms (however, machine learning is augmented and enhanced with software algorithms). The neural networks are modeled according to the neuronal structure of a mammal's cerebral cortex, where neurons are represented as nodes and synapses are represented as uniquely weighted paths or "tolled roads" between the nodes. The nodes are then organized into layers to comprise a network. Additionally, the neural networks are organized in a layered fashion that includes an input layer, intermediate or hidden layers, and an output layer.

The neural networks enhance their learning capability by varying the uniquely weighted paths based on received input. The successive layers within the neural network incorporate a learning capability by modifying their weighted coefficients based on their received input patterns. From this foundation, one can see that the training of the neural networks is very similar to how we teach children to recognize an object. The neural network is repetitively trained from a base data set, where results from the output layer (or, simply "output") are successively compared to the correct classification of the image. Similarly, in the present invention, a training data set is developed from labeled images of a mouse head and exploration objects to enhance the learning capability of the platform that is used to observe activities and behavior of the laboratory animals to provide accurate measurements during medical trials.

In an alternate representation, any machine learning paradigm instead of neural networks can be used in the training and learning process.

Artificial Intelligence enables the software of the present invention to be trained for the following:
  Clumping of cells or organisms
  Sperm cell health testing, e.g. motility or movement
  Feeding behaviors
  Sleep studies
  Cognitive research
  Drug studies, e.g. brain-behavior testing
  Other behavioral studies as evidenced by changes in movement or interaction And these capabilities enable the following key benefits:
  Artificial Intelligence (AI) enables the software to be highly flexible, capable of teaching itself to recognize a wide variety of organisms and behaviors, then automatically learn and improve from experience.
  Cloud based architecture requires no software to be installed, enable analysis to be centralized or shared among authorized users.
  User-configurable software settings on classifying behaviors, based on measured distance, time, or organism/object characteristics, provide features for a group of users to establish uniform procedures for health and quality testing.
  No specialized hardware or cameras required; in other words, there is no need for RFID, photobeams, infrared cameras, or the like. Users can upload an MP4 or MOV file recorded on a basic smartphone or equivalent camera and the software will use AI to recognize organisms, objects, and behaviors.
  Automation eliminates the need for highly skilled scientists to manually watch videos and consistently score movements or behaviors.

FIG. 1A illustrates a schematic representation of a laboratory system 100a, which helps in automatically determining behavior characteristics of an animal 106. The laboratory system 100a includes a camera 102 preferably, but not limited to, a video camera. Here, the camera 102 is mounted upon a tripod 104, and the camera 102 observes an animal 106 constrained in a container 110. In an embodiment of the present invention, the animal is any rodent such as mouse, rat, gerbil, etc. that is suitable for laboratory and clinical trials, but alternatively could be a laboratory observable animal such as a fish, or even primate.

The container 110 comprises one or more objects, including at least one known object 108 and at least one unknown object 112. The known object 108 and the unknown object 112 is of any shape such as rhomboid, pyramidal and the like. Further, although a generally open square container 110 is shown in FIG. 1A, the container may be of any shape, and may include interior dividing wall, or mazes, for example.

Figure 1B:
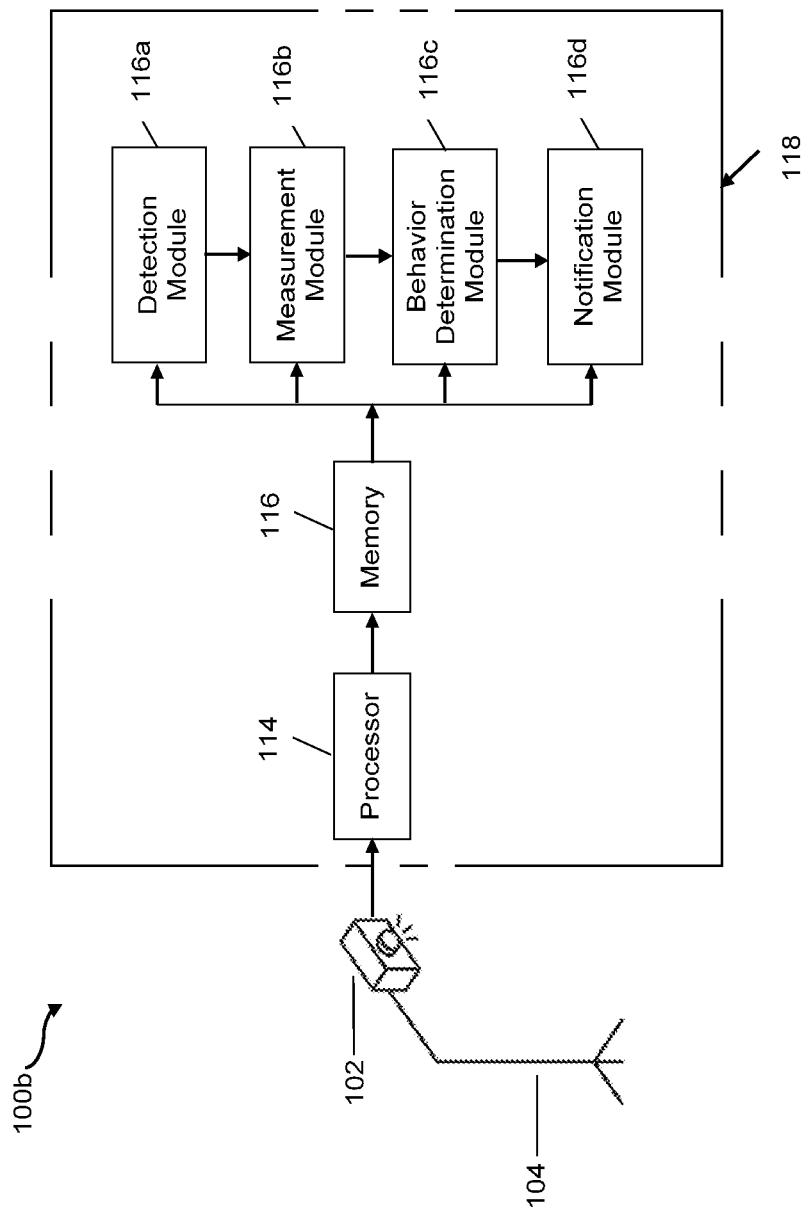
FIG. 1B illustrates a block diagram of a platform for automatically determining a behavior characteristics of an animal.

FIG. 1B illustrates a block diagram of a platform to automatically determine a behavior characteristics of an animal. Referring to FIG. 1B, the camera 102 captures at least one image of the animal 106 and transmits the image to the platform 118 to automatically determine the behavior characteristics of the animal 106. In additional embodiment, a plurality of images define a video, and the video is transmitted to the platform 118. The platform 118 includes a processor 114 and a memory 116. The memory 116 comprises stored instructions, which cause the platform 118 to perform functions on the video image(s) when executed by the processor 114.

Accordingly, the memory 116 preferably includes a detection module 116a, a measurement module 116b, a behavior determination module 116c and a notification module 116d. The detection module 116a detects the at least one feature points of the animal 106 and the one or more objects in the at least one video image after receiving it from the camera 102, where objects (here, 108 and 112) include at least one known object 108 and at least one unknown object 112. The detection module 116a utilizes a knowledge graph to detect the at least one feature points of the animal 106 and the one or more objects (again, here 108 and 112). In an embodiment of the present invention, the feature point(s) include body part(s) of the animal 106 such as a nose, a whisker(s), a head, a tail, or a waist, for example.

The measurement module 116b then measures a proximity between at least one feature point of the animal 106 and the objects (108, 112). In one embodiment, the measurement module 116b measures the proximity by determining center-of-mass of the feature points associated with the animal 106 in the image(s), and by tracking movements of the feature points in relation with the objects (108, 112) using the center-of-mass of the feature points. In this way, the tracked movement helps in measuring the proximity.

Once the proximity meets a pre-defined threshold criteria such as the center-of-mass of the mouse's head is less than four centimeters from the center-of-mass of the exploration object for a duration of less than or equal to one second, the behavior determination module 116*c* automatically determines the behavior characteristics of the animal 106. The behavior characteristics is determined in relation with the known object 108 and the unknown object 112. In an embodiment of the present invention, the behavior characteristics comprise at least one of a type of behavioral events of the animal 106, a time interval corresponding to each type of behavioral events, a number of occurrences of each type of behavioral events, a latency associated with each type of behavioral events, and distance traveled by the animal 106.

In another embodiment of the present invention, the time interval corresponding to each type of behavioral event is based on a time stamp assigned to an initial video frame and a final video frame of the at least one video image. The initial video frame indicates a start of the type of behavioral event and a final video frame indicates an end of the type of behavioral event, wherein the type of behavioral events comprises sniffing at the one or more objects (here, 108 and 112) and poking at the one or more objects.

The sniffing is an event counted when proximity between the at least one feature points and the at least one known object 108 or the at least one unknown object 112 meets a first pre-defined threshold criteria, where the first pre-defined threshold criteria is associated with a first value. Further, poking is an event counted when proximity between the feature point(s) and the known object 108 or the unknown object 112 meets a second pre-defined threshold criteria, where the second pre-defined threshold criteria is associated with a second value. In an embodiment of the present invention, the second value is greater than the first value, wherein the first value is 0.5 cm and the second value ranges between 1-4 cm.

The number of occurrences of each type of behavioral events is based on a measurement of each type of behavioral events for each video frame, and converting each video frame into a pre-defined time intervals.

After the behavior determination module 116*c* determines the behavior characteristics of the animal 106 based on the sniffing, poking and the like, a notification message indicating the behavior characteristics of the animal 106 is provided by the notification module 116*d*.

The platform 118 also generates a graphical interface or a heatmap that comprises an activity level of the animal 106 within each segment of the video frame. Preferably, the activity level indicates a time consumed by the animal 106 in performing the behavior characteristic(s) within each segment of the video frame, and provides a notification indicating the graphical interface.

In one embodiment of the present invention, the platform 118 is a software application that can be a web-based or cloud-based platform. In another embodiment of the present invention, the platform 118 is a downloadable software application. The platform 118 is operated on, but not limited to, a smart phone, a personal computer, a laptop, or an iPad, for example. The camera 102 is connected with the platform 118 via a communication means including a wired communication means or a wireless communication means such as, but not limited to, Bluetooth, near field communication, WI-FI, or universal serial bus, for example. The camera 102 transfers the at least one video image of the animal 106 to the platform 118 in real-time or in near real-time or in recorded form.

Figure 2:
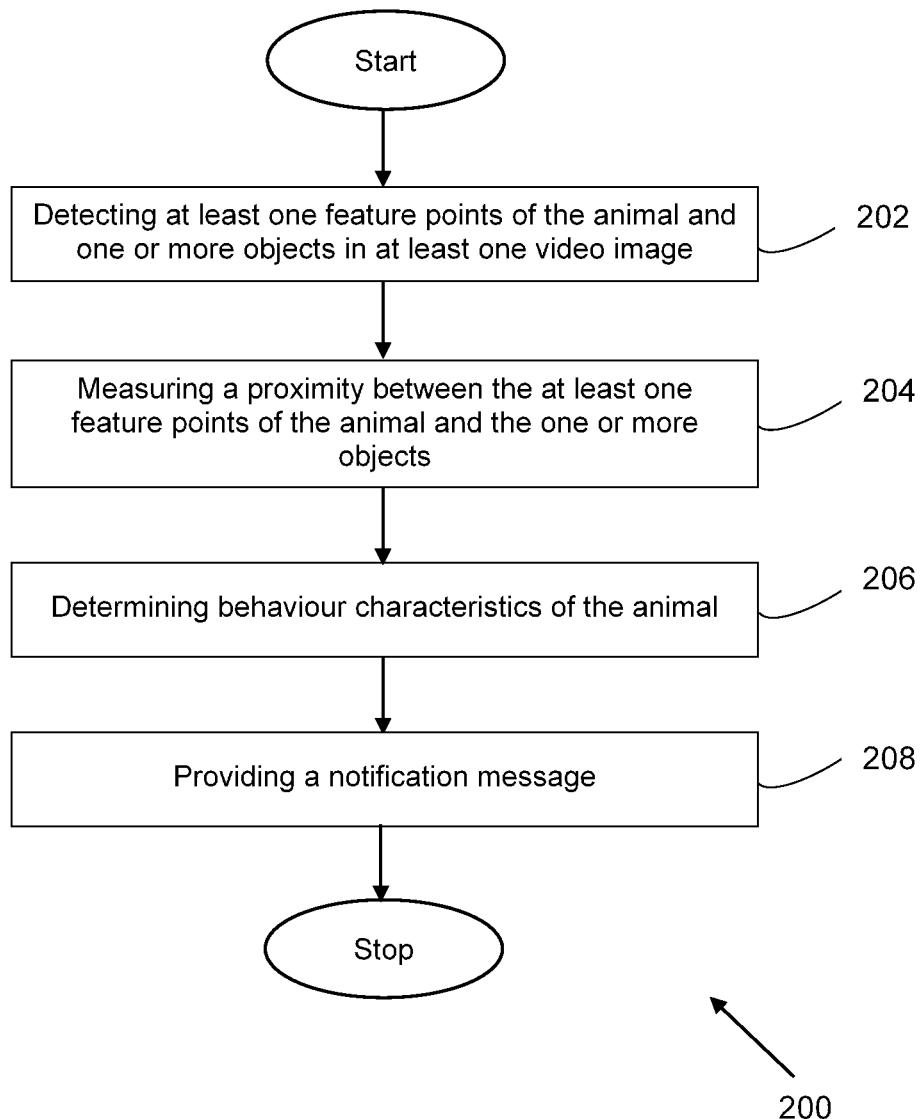
FIG. 2 illustrates a flow diagram representing working of the invention.

FIG. 2 illustrates a flow diagram representing an algorithm in accordance with an embodiment of the present invention. Referring to FIG. 2, shown is a method 200 to automatically determine behavior characteristics of an animal during clinical trials is provided. Once the camera 102 captures video image(s) of the animal 106 and transmits to the platform 118, a detection module 116*a* detects feature point(s) of the animal 106 and a object(s) (here, 108 and 112) in the video image(s) after receiving it from the camera 102 at act 202. The objects comprise at least one known object 108 and at least one unknown object 112. The detection module 116*a* utilizes a knowledge graph to detect the feature points of the animal 106 and the objects (108, 112). As discussed above, the feature points comprise a body part of the animal 106 such as a nose, whisker(s), a head, a tail, or a waist for example. The camera 102 utilizes a communication means such as a wired communication means or a wireless communication means such as Bluetooth, near field communication, wi-fi, or universal serial bus, for example, to transfer the video image(s) of the animal 106 in real-time or in near real-time or in a recorded form to the platform 118.

At act 204, a measurement module 116*b* measures a proximity between the feature point(s) of the animal 106 and the object(s) (here 108 and 112). And, the measurement module 116*b* measures the proximity by determining center-of-mass of the at least one feature points associated with the animal 106 in the video image(s) and by tracking movements of the feature point(s) in relation with the objects (108, 112) using the center-of-mass of the feature points.

Once the proximity meets a pre-defined threshold criteria, the behavior determination module 116*c* automatically determines the behavior characteristics of the animal 106 at act 206. The behavior characteristics is determined in relation with the known object 108 and the unknown object 112. In an embodiment of the present invention, the behavior characteristic(s) comprise at least one of a type of behavioral events of the animal 106, a time interval corresponding to each type of behavioral event(s), number of occurrences of each type of behavioral event(s), latency associated with each type of behavioral events, and distance travelled by the animal 106, for example.

In another embodiment of the present invention, the time interval corresponding to each type of behavioral event is based on a time stamp assigned to an initial video frame and a final video frame of the at least one video image. The initial video frame indicates a start of the type of behavioral event and a final video frame indicates an end of the type of behavioral event (again, such as sniffing and/or poking).

After the behavior determination module 116*c* determines the behavior characteristics of the animal 106 based on the sniffing, poking and the like at step 206, a notification message indicating the behavior characteristics of the animal 106 is provided by the notification module 116*d* at act 208. The method may further comprise an act of generating a graphical interface or heatmap.

In one embodiment, the method 200 involves the platform 118 to implement the aforementioned process, wherein the platform 118 is a software application that can be a web-based or cloud-based platform or can be downloaded.

Figure 3:
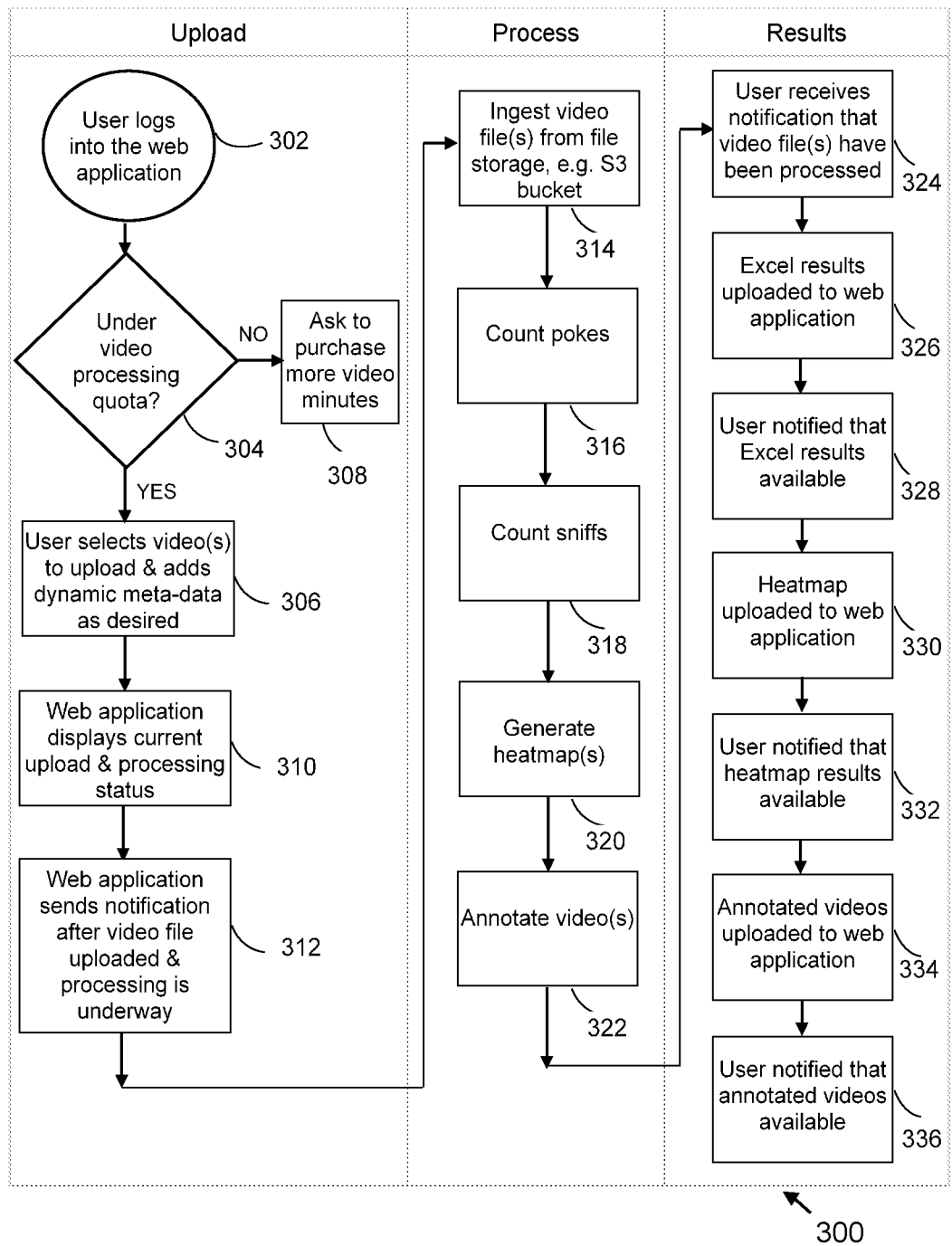
FIG. 3 illustrates a flow diagram to automate the laboratory measurements.

FIG. 3 illustrates a flow diagram to automate the laboratory measurements, in accordance with an embodiment of the present invention. The automation of laboratory measurements 300 can be categorized in three or more phases, shown here as an upload phase, a process phase and a result phase. The upload phase allows a user to upload video image(s) of the animal 106 under certain circumstances, such as a free video minute/second allowance. Once the user has received the video image(s) of the animal 106 via the camera 102, then the at least one video image can be analyzed further in order to determine the behavior of the animal 106 during clinical trial, wherein the video image(s) can be a recorded video, a real-time video, or a near real-time video, for example. The user logs into the platform 118 at act 302, wherein the platform can be hosted on cloud server or other suitable web-based server. In one embodiment, the platform 118 works in an offline mode. Once the user has been entered in the platform 118, he can upload the at least one video image after confirmation on a video processing quota at act 304. If the user has a free video minute allowance, he can select the at least one video image to upload at act 306; else the user can purchase more video minutes at act 308. In other words, if the platform has exceeded a quota of processing time, a user is prompted to purchase more processing time 308 and the algorithm returns to the user login act 302 following either the purchase or a decline to the purchase.

The user can also add dynamic meta-data to the at least one video image as desired at act 306. Metadata is information about a data that provides information about other data such as uploaded data. Various types of metadata exist that can be used in the present invention such as descriptive metadata, structural metadata, reference metadata, statistical metadata and administrative metadata, for example.

Once meta-data tagging has been done, the platform 118 displays the status of current upload of the video image(s) and processing status 310 and after completion of the upload, the platform 118 sends notification about underway processing and stored video image(s). The underway processing and the video image(s) is stored in a storage such as, but not limited to, S3 bucket. This notification is sent to the process phase where the uploaded video image(s) is ingested from the storage at act 314. Ingestion is the process of obtaining and importing data for immediate use or storage in a database. Here, the data is/are the video image(s) that can be streamed in real time or ingested in batches. On the basis of the ingested data, the platform 118 may perform functions such as: count pokes 316, count sniffs 318, generate heatmap(s) 320, and annotate video(s) 322, for example.

The total number of pokes, sniffs or other activity level generates a graphical interface images or heatmap(s) 320. The activity level indicates a time consumed by the animal 106 in performing the behavior characteristics within each segment of a video frame of the at least one video image. In other words, upon ingesting the video image(s), the platform 118 preferably produces the annotated output video file that includes captions for the animal 106 and object recognition, behavior scoring, plus an EXCEL report for behaviors and time stamps, along with a PNG file export that presents the heatmap of mouse activity. In an embodiment of the present invention, the report can also be generated in other formats such as MATLAB file, and the like.

The annotate video(s) act 322 includes a metadatum related to the behavioral characteristics of the animal 106. Once the annotation has been done by the platform 118, the user receives a notification that the at least one video image has been processed at act 324 and a corresponding EXCEL result is uploaded to the platform 118 at act 326. Simultaneously, the user is notified, at act 328, that the EXCEL results are available for review. Further, the heatmap of the activity level is uploaded to the platform 330 and the user is notified with the heatmap result at act 332. Furthermore, the annotated video is uploaded to platform 118 at act 334 and the user is notified of the annotated video at act 336. Accordingly, results are generated.

The EXCEL report preferably includes three tabs: General Report (pokes (standard, novel), sniffs (standard, novel), and distance travelled), Sniffs (start time, duration), and Time Slicing (by minute interval report for pokes, sniffs, and distance travelled). The standard pokes and sniffs denote values for the at least one known or familiar object 108, whereas novel pokes and sniffs denote values for the at least one unknown or novel object 112. Further, Heatmap(s) of mouse activity are generated by breaking a box into [user-configurable] 25×25 pixel elements to illustrate the overall time spent within elements of the box. One Heatmap is preferably shown in the form of colored matrix, where the lighter colors represent higher level of time spent in a particular region of the box.

The present invention has the capability to handle video image processing for both MP4 files and .MOV files as well as other video formats. Object detection code operates as a fully convolutional neural network with whole image identification within the bounding box, allowing the platform to see the context surrounding an image and reduce errors for what the software sees as similar background objects. The output video file displays the probability determination for the recognized objects. For example, the platform believes that the object it recognizes is, within 99.15% probability, a known object.

The present invention calculates the distance that the animal travelled by time slices, such as 1 minute time slices and calculate pokes by video frame, then convert video frames to time intervals in order to calculate the software estimated number of pokes, sometimes called "adjusted pokes." These calculations are software-configurable for sensitivity control, which can be extended to an end user operated user interface. Further, the sniffs are converted by video frame, then convert to software estimated sniffs, i.e. adjusted sniffs.

Accordingly, the present invention eliminates the need for human based, manual scoring techniques. Automation enables an extensive number of behavior tests to be scored, reported and analyzed through a centralized database on a cloud-computing platform; generates data not feasible for humans to produce, such as heatmaps to identify high mouse activity zones, calculations for distance travelled, plus [user configurable] minute-by-minute reporting on pokes, sniffs, and distance travelled.

Specific Example of Training AI

One training data set was developed from labeled images of each mouse head and exploration objects, derived from the videos that were manually reviewed and scored according to the following Behavior Test protocol. This was done for investigating sleep behavior as a proxy for cognitive impairment disorders, such as dementia, and the like, for example:

Housing Conditions:

Reverse light: dark—12:12 lights on at 9:00 pm

Food and water Ad libitum

Ambient temp and humidity

Testing Cage and Environment:

1. Square chamber (cage) with white walls, to contrast the color of the mice.

2. Cage dimensions are 15.5×17.5 inches

3. Objects are different shaped colored blocks (blue square, green triangle, red cylinder)

4. Experiments conducted under 20-22 lux lights

5. Experiments begin at two hours into dark phase

Experimental Groups: Test animals one at a time within 1 hour.

Habituation period: Days 1-3 to allow the mouse to become familiar with the testing arena so as not to introduce too many novelties at once.
1. The habituation consists of placing the mouse in the testing cage for 5 minutes, wiped down and sanitized before and after each time a mouse is placed in.
2. Mice will be placed in the testing cage by means of mouse flipping, which is the transfer of a mouse by grasping their tail.
3. One experimenter will be transferring mice and objects, while another experimenter will be filming the test and streaming to behavior cloud.

Training: Day 1
1. Animal is released with its back to the objects and near the center of the wall.
2. The training portion will take place 6 minutes after habituation, during which two identical objects will be placed at opposite ends of the testing cage. The mouse will then be placed in the testing cage for at least 5 minutes and allowed to explore both objects for at least 20 seconds each. After the allotted time, the mouse will be placed back into its original cage.
3. The experiment will conclude with the testing portion, which will take place 24 hours after training (ZT=13). In the time immediately after the training session, the mice in the sleep deprived group will be sleep deprived for 24 hours by means of a slowly-rotating wheel.

Testing: Day 2—Following 24 Hours of Sleep Restriction
1. The testing session will consist of placing the previous identical objects into opposite ends of the testing cage. Testing will last for 3 minutes, during which the mouse will be allowed to explore both objects. After, the mouse will be placed back in its original cage. After a 3 minute rest, a new object will replace one of the previous objects and exploration will be recorded for 3 minutes. Once exploration is complete the mouse will be placed back in its home cage and the experiment will be concluded.

Benefits

This software removes the subjectivity associated with a person simultaneously observing, estimating distances, and interpreting behavior. The software calculates distance between the center-of-mass of designated regions, such as the distance between the centers of mass of the head of a mouse and blocks. Each distance calculation is timestamped for each frame of video for which this measurement is performed. Thereafter, the software applies the user-configurable rules for classifying behavior.

As a result, the software generated classification of exploration behaviors are more consistent that human interpretation of behavioral activities, with the software employing AI to recognize and perform consistent tracking of a defined region of a body and objects without human intervention in order to generate uniform data that enables users to carry out a defined protocol for modeling behaviors. This software provides user-configurable controls (e.g. knobs and dials) that enable users to uniformly adjust the interpretation of behavior data based on research goals, without impacting the integrity of the AI collected data.

Further, with the capability to "time-slice" data or consider displacement as a vector (vs. a scalar) and model its rate of change over time (derivative), the invention can take advantage of the inventive software. First, it can establish a statistically significant sample of set of what is "normal" behavior, which is much more feasible with AI automation that requires no human labor other than uploading files. Secondly, it can track direction and velocity to establish a "new" behavioral model for symptoms, including: Psychomotor agitation, social withdrawal, decreased place preference for a caged peer conspecific, decreased preference for social novelty, decreased nesting behavior, and home-cage social interaction.

Although the invention has been explained in relation to its preferred embodiment, it is to be understood that many other possible modifications and variations can be made without departing from the spirit and scope of the invention. Obvious changes, modifications, and substitutions may be made by those skilled in the art to achieve the same purpose the invention. The exemplary embodiments are merely examples and are not intended to limit the scope of the invention. It is intended that the present invention cover all other embodiments that are within the scope of the descriptions and their equivalents.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (including touchscreen, keyboard, mouse, voice recognition, for example), and network interfaces, for example.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein.

A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices—for example, a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

To enhance readability, conditional plurality forms are used. For example, rather than stating one or more of a particular item as "one or more [of an item]" repetitively, the disclosure uses the more casual (s) form; such that "item(s)" may be read "one or more of item" or in the grammatical form appropriate for the context.

The networked devices described herein may be in the form of a mobile communication device (for example, a cell phone), laptop, tablet computer, interactive television, game console, media streaming device, head-wearable display, virtual or augmented reality device, or networked watch, for example. The networked devices may optionally include displays, user input devices (such as a touchscreen, keyboard, mouse, voice recognition, etc.), and network interfaces, for example.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

I claim:

1. A method for automatically determining behavior characteristics of an animal during clinical trials, the method comprising:
   detecting, by a detection module, at least one feature points of said animal and one or more objects in at least one video image, wherein said one or more objects comprises at least one known object and at least one unknown object;
   measuring, by a measurement module, a proximity between said at least one feature points of said animal and said one or more objects;
   automatically determining behavior characteristics, by a behavior determination module, of said animal by detecting that said proximity meets a predefined threshold criteria, wherein said behavior characteristics comprises at least one of a type of behavioral events of said animal, a time interval corresponding to each type of behavioral events, number of occurrences of each type of behavioral events, latency associated with each type of behavioral events, and distance travelled by said animal;
   providing a notification message, by a notification module, indicating said behavior characteristics of said animal;
   the type of behavioral events comprises sniffing at one or more objects and poking at one or more objects; and
   the sniffing is an event counted when proximity between said at least one feature points and said at least one known object or said at least one unknown object meets a first pre-defined threshold criteria, wherein said first pre-defined threshold criteria is associated with a first value.

2. A method for automatically determining behavior characteristics of an animal during clinical trials, the method comprising:
   detecting, by a detection module, at least one feature points of said animal and one or more objects in at least one video image, wherein said one or more objects comprises at least one known object and at least one unknown object;
   measuring, by a measurement module, a proximity between said at least one feature points of said animal and said one or more objects;
   automatically determining behavior characteristics, by a behavior determination module, of said animal by detecting that said proximity meets a predefined threshold criteria, wherein said behavior characteristics comprises at least one of a type of behavioral events of said animal, a time interval corresponding to each type of behavioral events, number of occurrences of each type of behavioral events, latency associated with each type of behavioral events, and distance travelled by said animal;

providing a notification message, by a notification module, indicating said behavior characteristics of said animal;

the type of behavioral events comprises sniffing at one or more objects and poking at one or more objects; and the poking is an event counted when proximity between said at least one feature points and said at least one known object or said at least one unknown object meets a second pre-defined threshold criteria, wherein said second pre-defined threshold criteria is associated with a second value.

3. The method of claim 2, wherein said second value is greater than said first value.

4. A system for automatically determining behavior characteristics of an animal, the system comprising:

at least one processor; and a memory having stored instructions, the instructions causing the system to perform functions when executed by the at least one processor, the functions comprising:

detecting, by a detection module, at least one feature points of an animal and one or more objects in at least one video image, wherein said one or more objects comprises at least one known object and at least one unknown object;

measuring, by a measurement module, a proximity between said at least one feature points of said animal and one or more objects;

automatically determining behavior characteristics, by a behavior determination module, of said animal by detecting that said proximity meets a predefined threshold criteria, wherein said behavior characteristics comprises at least one of a type of behavioral events of said animal, a time interval corresponding to each type of behavioral events, number of occurrences of each type of behavioral events, latency associated with each type of behavioral events, and distance travelled by said animal;

providing a notification message, by a notification module, indicating said behavior characteristics of said animal;

the type of behavioral events comprises sniffing at one or more objects and poking at one or more objects; and the sniffing is an event counted when proximity between said at least one feature points and said at least one known object or said at least one unknown object meets a first pre-defined threshold criteria, wherein said first pre-defined threshold criteria is associated with a first value.

5. The system of claim 4, wherein said poking is an event counted when proximity between said at least one feature points and said at least one known object or said at least one unknown object meets a second pre-defined threshold criteria, wherein said second pre-defined threshold criteria is associated with a second value.

6. The system of claim 5, wherein said second value is greater than said first value.

* * * * *